Patented Sept. 6, 1949

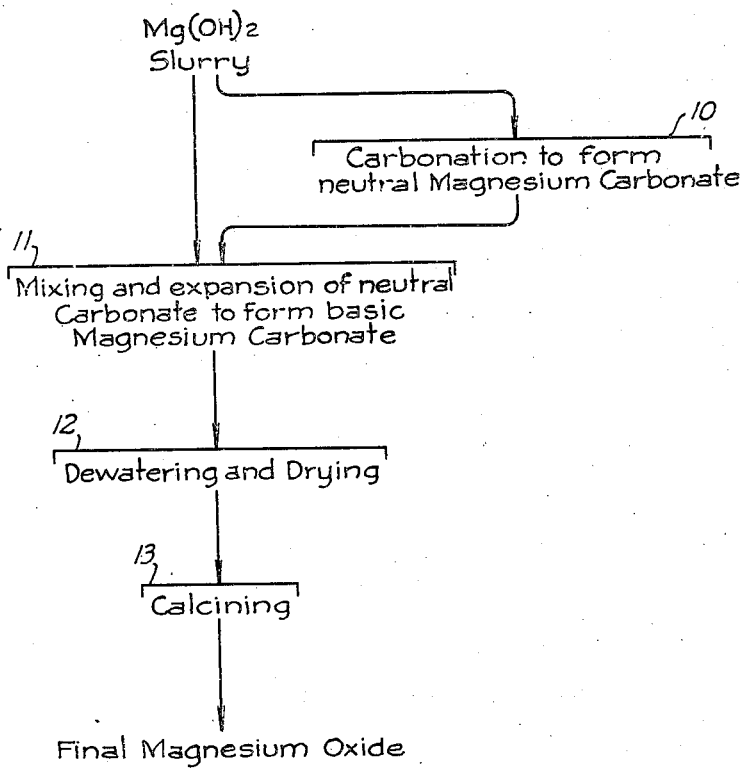

2,480,904

UNITED STATES PATENT OFFICE 2,480,904

PROCESS FOR THE MANUFACTURE OF MAGNESIUM OXIDE

Robert E. Clarke, Palo Alto, and Neil R. Collins, Los Altos, Calif., assignors to Marine Magnesium Products Corporation, South San Francisco, Calif., a corporation of Delaware Application June 25, 1946, Serial No. 679,050

3 Claims. (Cl. 23—201)

This invention relates generally to a magnesium oxide having special characteristics and to a method for its manufacture.

In the rubber industry magnesium oxide has been found to be a useful ingredient for compounding with neoprene. Commercial neoprene as manufactured in the United States consists of polymers of chloroprene and is commonly sold in slabs by manufacturers of the raw material. Purchasers mill the raw material with magnesium oxide and other compounding ingredients such as carbon black, zinc oxide, etc., to form a neoprene stock suitable for bin storage, and which can be used from time to time for final vulcanization or curing. It has been found that all of the various grades and types of magnesium oxide are not suitable for compounding with neoprene. The only type which has been deemed suitable in the past is commonly designated as "extra light calcined magnesia," and has an apparent density ranging from about 3½ to 6 lbs. per cubic foot.

The purpose of compounding magnesium oxide with neoprene has been primarily to prevent what is referred to as "scorch." This term is used with reference to premature curing of the neoprene during the milling or mixing operation, at which time considerable heating occurs due to the action of the mixing machines employed. A further purpose is to retard progression of curing during bin storage. The reasons why magnesium oxide prevents scorching and retards undesired curing during storage are not clearly understood, but it appears to function as a neutralizing agent to neutralize acids which are known to be present or to form in connection with curing.

The extra light grades of magnesium oxide used in the past have not been entirely satisfactory to prevent scorch and undesired curing. Experience has shown that such oxides may not altogether prevent scorching, and in general do not provide a sufficient margin of safety against both scorching and undesired curing during storage. Thus the results of ultimate milling and curing are not predictable, and occasionally milled neoprene stock which has been stored is found to be cured to such an extent that it is unfit for further processing.

It is an object of the present invention to provide an improved magnesium oxide for compounding with neoprene, and which in particular will afford better protection against scorch and undesired curing during storage.

A further object of the invention is to provide a new method for the manufacture of a magnesium oxide having characteristics as outlined above.

Further objects and features of the invention will appear from the following detailed description.

Our magnesium oxide differs in many respects from conventional "extra light calcined magnesia." Particularly it differs from such conventional material in its chemical and adsorptive activity, and its use as a compounding agent with neoprene results in distinct advantages which will be presently outlined in detail. Conventional extra light calcined magnesia is produced by calcining basic magnesium carbonate. Our product is produced by calcining a material consisting of both basic magnesium carbonate and magnesium hydroxide. This material is prepared by mixing magnesium hydroxide with neutral magnesium carbonate, which is then heated to an elevated temperature to expand the neutral carbonate to form basic magnesium carbonate. Calcining of material is carried out under such conditions of time and temperature as to provide magnesium oxide having relatively high adsorptive activity.

A more specific procedure for carrying out our method can be explained in connection with the flow sheet of the attached drawing. As indicated in the flow sheet a suitable source of magnesium hydroxide is provided in slurry form. The slurry may contain from 2 to 10% of solids; from 2 to 6% being a preferable range. It should be reasonably free of contaminants such as sodium chloride or calcium compounds. It is desirable that the particles be of relatively small size, as for example less than 3 microns in diameter for the bulk of the material. Magnesium hydroxide having such characteristics can be produced by precipitation of convertible magnesium salts from sea water, as is disclosed for example in Patent No. 2,089,339. A part of this material is carbonated at 10 to form neutral magnesium carbonate. This step can be carried out by contacting a batch of the material at atmospheric pressure with carbon dioxide gas, as for example by introducing flue gas containing carbon dioxide into the slurry. The neutral magnesium carbonate slurry is then mixed with a given amount of the magnesium hydroxide slurry, as indicated at 11, and the mixture heated to an elevated temperature to expand and convert the neutral magnesium carbonate to basic magnesium carbonate.

While it is generally convenient to treat a separate batch of magnesium hydroxide with carbon dioxide or flue gas to produce the desired quantity of neutral magnesium carbonate, it is possible, in carbonation a batch of the magnesium hydroxide to carbonate the same short of conversion of all of the magnesium hydroxide, whereby the desired ratio between magnesium hydroxide and neutral magnesium carbonate is provided. In any event a given ratio between these ingredients should be provided for the operation 11, and preferably the amount of magnesium hydroxide present in the mix before expansion can be of the order of 50 to 75% on a molecular basis.

Heating of the mixture to expand the neutral magnesium carbonate to form basic magnesium carbonate can be carried out according to conventional methods. Briefly a batch of the material can be heated in an open kettle or tank to a temperature of the order of 185° F. to effect the desired expansion or conversion.

After expansion the resulting slurry is dewatered and dried as indicated at 12. This can be carried out for example by a filtering operation to remove excess water, followed by drying the resulting filter cake by contact with hot drying gas in drying equipment of the tunnel type. It is preferable however to eliminate water to the extent of providing a slurry containing from 11 to 13% solids, after which the slurry is spray dried in the manner disclosed in Patent No. 2,073,398.

The calcining operation can be carried out in the manner disclosed in Patent No. 2,234,367. Both temperature and time of calcining are controlled to convert the major part but not all of the material to magnesium oxide. For example preferably from 89 to 93% is converted to magnesium oxide, leaving the remaining part unconverted. Assuming that the material is spray dried prior to calcining then no further treatment is required. However, in the event the material has been dried in the form of lumps or in granular form, the calcined material should be ground to form a powder of suitable fineness. Assuming that proper adjustment is made of the calcining time, the calcining temperatures may range from 1000 to 1800° F. and good results have been obtained in practice by using a temperature of the order of 1600° F. In general for a given calcining temperature the time period of calcining treatment is made such that the material will have the degree of conversion and adsorptive activity desired.

Assuming manufacture according to the method described above, and by calcining the spray dried material, the final product has an apparent density ranging from about 9 to 15 lbs. per cubic foot, and an adsorptive activity in terms of iodine index ranging from about 80 to 100, 90 being optimum. By iodine index we have reference to the index of adsorptive properties of the material as described in said Patent No. 2,234,367.

An analysis of a typical material produced by our method was as follows:

|  | Per cent |
|---|---|
| Magnesium oxide, MgO | 91.00 |
| Calcium oxide, CaO | .80 |
| Combined water, H$_2$O | 4.01 |
| Carbon dioxide, CO$_2$ | 3.19 |
| Silicon dioxide, SiO$_2$ | .21 |
| Chlorides as, NaCl | .30 |
| Sulphates as, SO$_3$ | .43 |
| Iron oxide, Fe$_2$O$_3$ | .02 |
| Aluminum oxide, Al$_2$O$_3$ | .04 |

The above material had an apparent density of 9.15 lbs. per cubic foot, and an iodine index of 91.

In the above example the particle size distribution of the agglomerates was as follows:

76% less than 18 microns
68% less than 13 microns
59% less than 11 microns
50% less than 9 microns
39% less than 6 microns
28% less than 4 microns
23% less than 3 microns
18% less than 2 microns
14% less than 0.4 microns The specific surface of the above material measured about 7,250 square centimeters per gram.

Tests of our material have been made to determine its effectiveness and utility as a compounding ingredient in neoprene. In one such comparative tests two master compounds (mixes) A & B were prepared, as follows:

|  | Compound A | Compound B |
|---|---|---|
|  | Parts | Parts |
| Neoprene GR-M | 100 | 100 |
| Petrolatum | 2 | 2 |
| Phenyl-Beta-Napthylamine | 2 | 2 |
| Carbon Black | 28.8 | 28.8 |
| Zinc Oxide | 5.0 | 5.0 |
| Standard Extra Light Magnesium Oxide | 4.0 |  |
| Magnesium Oxide made by the foregoing method |  | 4.0 |

It will be noted that compound A contained conventional extra light magnesium oxide such as has been used in the past in the compounding with neoprene. Compound B contained the same amount of our new product. The compounds were prepared by the use of conventional milling equipment after which they were permitted to age for a period of the order of 2 days, and then remilled and cured under time-temperature conditions as follows:

|  | Cure | Hardness | Modulus 300% | Modulus 500% | Tensile | Elongation |
|---|---|---|---|---|---|---|
| Compound A | 30 min. at 240° F. | 45 | 580 | 1,100 | 1,900 | 820 |
| Compound B | do | 35 | 670 | 800 | 860 | 525 |
| Compound A | 45 min. at 240° F. | 49 | 605 | 1,200 | 2,200 | 880 |
| Compound B | do | 40 | 725 | 1,160 | 1,020 | 540 |

The purpose of the above test was to determine the extent to which the neoprene had been protected against scorching. It will be noted that compound B (containing our product) for both the 30 and 45 minute cures showed less hardness than compound A containing the conventional light magnesium oxide, and likewise the results for modulus, tensile and elongation demonstrated the fact that compound B was relatively undercured for the treatment specified, compared to the amount of curing effected in compound A. Actually the test slabs for the compound B produced during the course of this test were obviously greatly undercured, in that they were spongy and stuck badly to molds. In normal rubber laboratory testing procedure it is probable that no effort would have been made to test for hardness, modulus, tensile and elongation, and such samples would have been reported as uncured. The same also applies to compound B when cured for 45 minutes, although the greater time period resulted in evidence of greater cure.

The 240° F. used in the foregoing test is representative of processing temperatures to which batches of material are heated during normal milling. Therefore the test showed conclusively that our magnesium oxide is capable of protecting the neoprene against scorching during processing and curing during storage far better than conventional light magnesia.

A further test was made to demonstrate the fact that our product does not retard cure of the neoprene at normal curing temperatures such as are employed by the rubber industry. For these tests the same compounds A and B were used, and the treatment and results were as follows:

|  | Cure | Hardness | Modulus 300% | Modulus 500% | Tensile | Elongation |
|---|---|---|---|---|---|---|
| Compound A | 15 Min. at 287° F. | 50 | 840 | 1,580 | 2,750 | 875 |
| Compound B | ---do----- | 50 | 770 | 1,600 | 2,750 | 850 |
| Compound A | 15 Min. at 310° F. | 51 | 1,160 | 2,150 | 2,950 | 770 |
| Compound B | ---do----- | 51 | 1,130 | 2,100 | 2,800 | 700 |

The last mentioned test demonstrates that neoprene compounded with our magnesium oxide can be subjected to ordinary final curing treatment, and that our oxide does not result in any undue retarding of the cure at the temperatures employed, in this instance 287 and 310° F.

From the foregoing it is evident that our material is distinctly superior to conventional light magnesia for compounding with neoprene, particularly in that it affords better protection against scorching, and undesired curing during storage. Physical and chemical characteristics which are believed to contribute to the results secured include the following: The material is of relatively small particle size, which is attributed to the small particle size of the precipitated magnesium hydroxide used as the source material. The calcined material has a distinct lattice structure which contributes to high adsorptive activity. The iodine index appears to be optimum for neutralizing acid present or developed during processing and aging, without however interfering with the final cure. In addition to chemical and adsorptive activity of the magnesium oxide, the presence of some highly active unconverted magnesium hydroxide uniformly distributed throughout the calcined material, is believed to contribute materially to its effectiveness in producing the results desired. Due to the relatively small particle size and favorable particle size distribution, a relatively large area is provided per unit weight of the material used in the neoprene compound.

As previously indicated it is desirable to spray dry the slurry after expansion, as distinguished from drying in cake or granular form followed by calcining and then grinding. Calcining the spray dried material appears to afford a material having more desirable chemical and adsorptive activity, aside from eliminating the final grinding operation.

Previous reference has been made to the lattice structure of the calcined material. It can be explained in this connection that the basic magnesium carbonate prior to calcination has a characteristic lattice structure, and this structure forms an excellent supporting framework for attachment of the small sized magnesium hydroxide particles. We believe that the presence of such a supporting framework and its presence during the drying step prevents agglomeration of the magnesium hydroxide during the drying operation. Therefore the material being calcined consists of the characteristic framework of the basic magnesium carbonate with unagglomerated magnesium hydroxide particles attached to the framework. Calcination is conducted at relatively low temperatures and for time periods which prevent destruction of the lattice structure, and therefore both the particles of magnesium oxide resulting from the decomposition of the hydroxide, and unconverted hydroxide particles, remain attached to the same framework and in highly dispersed state. It is believed that the characteristics just described materially contribute to the effectiveness of the product and that the unconverted magnesium hydroxide dispersed throughout the oxide lattice is extremely active as a neutralizing agent.

We claim:

1. In a process for the manufacture of a magnesium oxide suitable for compounding with synthetic rubber of the chloroprene type, forming a slurry of neutral magnesium carbonate and magnesium hydroxide, the amount of magnesium hydroxide being of the order of 50 to 75% on a molecular basis and having the bulk of its particles less than about 3 microns in diameter, heating the slurry to an elevated temperature whereby a slurry is formed consisting of basic magnesium carbonate together with a substantial amount of uncombined residual magnesium hydroxide, spray drying the slurry to form a dry divided material, and calcining the dry material to a temperature of the order of 1000° to 1800° F. to convert both basic magnesium carbonate and magnesium hydroxide components to magnesium oxide, said calcining being continued for a period of time sufficient to convert the major part but not all of the material to magnesium oxide.

2. In a process for the manufacture of a magnesium oxide suitable for compounding with synthetic rubber of the chloroprene type, the steps of forming a slurry of neutral magnesium carbonate and magnesium hydroxide, the amount of magnesium hydroxide present being at least about 50% on a molecular basis, heating the slurry to convert the neutral magnesium corbonate to basic magnesium carbonate, the amount of magnesium hydroxide present in the slurry being such as to provide a substantial content of magnesium hydroxide after said heating, and then calcining the material to convert both basic magnesium carbonate and magnesium hydroxide components to magnesium oxide.

3. In a process for the manufacture of a magnesium oxide suitable for compounding with synthetic rubber of the chloroprene type, forming a slurry of neutral magnesium carbonate and uncombined magnesium hydroxide, the magnesium hydroxide being present in an amount of at least about 50% on a molecular basis and having the bulk of its particles less than about 3 microns in diameter, heating the slurry to an elevated temperature whereby a slurry is formed consisting of basic magnesium carbonate together with a susbtantial amount of chemically uncombined magnesium hydroxide, drying the slurry to form a dry divided material, and then calcining the dry material at a temperature of from 1000° to 1800° F. to convert both basic magnesium carbonate and magnesium hydroxide components to magnesium oxide, the calcining being continued for a period of time sufficient to convert the major part but not all of the material to magnesium oxide.

ROBERT E. CLARKE.
NEIL R. COLLINS.

REFERENCES CITED

The following references are of record in the file of this patent:

UNITED STATES PATENTS

| Number | Name | Date |
|---|---|---|
| 1,573,632 | Crowell | Feb. 16, 1926 |
| 2,139,934 | Chesny II | Dec. 13, 1938 |
| 2,234,367 | Chesny I | Mar. 11, 1941 |
| 2,322,554 | Winding II | June 22, 1943 |
| 2,322,555 | Winding III | June 22, 1943 |
| 2,357,987 | Winding I | Sept. 12, 1944 |

OTHER REFERENCES

Chesny, "Magnesium Compounds from Ocean Water," "Industrial & Engineering Chemistry," vol. 28, No. 4 (Apr. 1936), pp. 383–390.